US009485750B2

(12) United States Patent
Harris et al.

(10) Patent No.: US 9,485,750 B2
(45) Date of Patent: Nov. 1, 2016

(54) METHOD FOR EFFECTIVE FAST RE-PAGING IN A WIRELESS COMMUNICATION NETWORK

(75) Inventors: John M. Harris, Glenview, IL (US); Donivon Hettich, Wauconda, IL (US); Mark J. Marsan, Elmhurst, IL (US); Paul M. Erickson, Palatine, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1636 days.

(21) Appl. No.: 12/043,976

(22) Filed: Mar. 7, 2008

(65) Prior Publication Data

US 2008/0254814 A1    Oct. 16, 2008

Related U.S. Application Data

(60) Provisional application No. 60/912,010, filed on Apr. 16, 2007.

(51) Int. Cl.
*H04W 68/00*    (2009.01)
*H04W 4/00*    (2009.01)
*H04W 24/00*    (2009.01)
*H04W 68/06*    (2009.01)
*H04W 64/00*    (2009.01)
(Continued)

(52) U.S. Cl.
CPC ............ *H04W 68/06* (2013.01); *H04W 64/00* (2013.01); *H04W 68/02* (2013.01); *H04W 68/08* (2013.01)

(58) Field of Classification Search
CPC ... H04W 68/02; H04W 68/06; H04W 68/08; H04W 64/00
USPC .............. 455/426.1, 458–459, 515, 436, 455/438–440, 435.1, 456.1–456.6, 101, 455/422.1
See application file for complete search history.

(56) References Cited

U.S. PATENT DOCUMENTS 5,966,662 A * 10/1999 Murto ......................... 455/458
6,035,203 A    3/2000 Hanson
6,363,255 B1    3/2002 Kuwahara
(Continued)

FOREIGN PATENT DOCUMENTS

WO    9959370    11/1999
WO    0036868    6/2000

OTHER PUBLICATIONS

The State Intellectual Property Office of the People's Republic of China: Notification of the First Office Action, Nov. 24, 2011, all pages.

(Continued)

*Primary Examiner* — Thai Vu
(74) *Attorney, Agent, or Firm* — Faegre Baker Daniels LLP

(57) ABSTRACT

A method for paging a mobile station where the mobile station (208-212) may be in a dormant state is described. The method begins by sending a first paging message (302) in a first zone (214) of a given area to a selected mobile station wherein the first paging message is sent at the beginning of a paging interval (300). A base station (202-206) then receives a response to the paging message when the mobile station is in the first zone. When the response to the first paging message is not received, a second paging message (306) is sent in a second zone (216) of the given area. The second paging message is sent at a first offset (308) from the sending of the first paging message wherein this first offset occurs less than one paging interval after the sending of the first page message.

6 Claims, 6 Drawing Sheets

(51) Int. Cl.
*H04W 68/02* (2009.01)
*H04W 68/08* (2009.01)

(56) References Cited

U.S. PATENT DOCUMENTS

| | | | |
|---|---|---|---|
| 7,602,793 B2* | 10/2009 | Picot et al. | 455/440 |
| 7,636,577 B2* | 12/2009 | Mohanty et al. | 455/458 |
| 7,711,377 B2* | 5/2010 | Laroia et al. | 455/458 |
| 2002/0187793 A1* | 12/2002 | Papadimitriou et al. | 455/458 |
| 2005/0153714 A1 | 7/2005 | Subrahmanya | |
| 2006/0133269 A1* | 6/2006 | Prakash et al. | 455/515 |
| 2007/0021114 A1* | 1/2007 | Capece et al. | 455/426.1 |
| 2007/0120679 A1* | 5/2007 | Shin et al. | 455/344 |
| 2007/0149217 A1* | 6/2007 | Balachandran et al. | 455/456.1 |
| 2007/0201377 A1* | 8/2007 | Santhanam | 370/252 |
| 2007/0224989 A1* | 9/2007 | Soong et al. | 455/436 |

OTHER PUBLICATIONS

International Search Report and Written Opinion; International Application No. PCT/US2008/059549; dated Jul. 28, 2008.
Chinese Patent Office; Notification of Reexamination; Chinese Application No. 200880012438.4; dated Apr. 7, 2015.
Chinese Patent Office; Notification of the Second Office Action; Chinese Application No. 200880012438.4; dated Jul. 4, 2012.
Chinese Patent Office; Decision of Rejection; Chinese Application No. 200880012438.4; dated Apr. 3, 2013.
Korean Patent Office; Notice of Preliminary Rejection; Korean Application No. 10-2009-7021515; dated Feb. 16, 2011.
State Intellectual Property Office of the People's Republic of China, Notification of Reexamination for Chinese Patent Application No. 200880012438.4, mailed Aug. 21, 2015.

* cited by examiner

METHOD FOR EFFECTIVE FAST RE-PAGING IN A WIRELESS COMMUNICATION NETWORK

FIELD OF THE INVENTION

The present invention relates generally to paging of mobile stations in a wireless communication network and, in particular, to an effective method for fast re-paging of the mobile station within a paging interval.

BACKGROUND

In a wireless communication network, a mobile station operates in at least two modes. In an active mode, the mobile device is in active communications and is transmitting and receiving messages with a base station. In a dormant mode, the mobile device performs as few functions as possible, including limiting the number of messages being transmitted to the base station, in order that the mobile device conserves battery power. As such, the mobile station may wake-up at given periods of time to determine if a paging message is being sent to it from the base station serving the cell in which the mobile station is operating.

When a mobile device is in its dormant mode, the base stations and other network infrastructure equipment may not know the location of the mobile station because the mobile station is not sending any messages for the network with which the network can locate the mobile station. Accordingly, there are known a number of different models in which a mobile device is paged when it is dormant mode. One prior art approach is to page the mobile over the entire paging zone. This approach can be expensive in terms of paging costs, battery resources and other network resources because of the size of the paging zone and the energy needed to page over that area.

In another approach, the wireless communication network uses a hierarchical model, as shown in FIG. 1, to page the mobile stations. In this hierarchical model, the base station begins by paging the mobile station only in the last known zone at the first paging interval 102. As seen, the last known zone is represented by bar 104. If the mobile station does not respond, the base station then pages in neighboring areas, represented by bars 106, 108, at a second paging interval 110, 112. The number of areas and the size of the paging zones can be adjusted depending on resources and network performance factors. This approach, however, can add a large amount of delay in establishing communication when the target mobile station is not in the last known zone. The delay can be equal to an entire additional paging cycle or more than one such cycle.

Alternatively, the mobile station can be placed in a tighter mobility tracking mode. In this mode, the network uses location services, such as global positioning services, to determine the location of a mobile station. This approach also consumes battery resources as well as access channel capacity in performing the numerous updates needed to locate the mobile station.

In addition, the mobile station or access terminal can wake up very frequently, e.g. every 80 ms. This enables hierarchical paging to reduce the number of pages that need to be sent, but it can cause an issue for battery life. Specifically, it can drain the battery approximately 30 times faster where the mobiles paging interval normally is 2.4 seconds. Thus, it is not a viable to have a mobile wake up more frequently in order to make hierarchical paging practical. In view of the foregoing, there is a need to overcome the deficiencies of the prior art in paging a mobile station. In this way battery life can be conserved.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
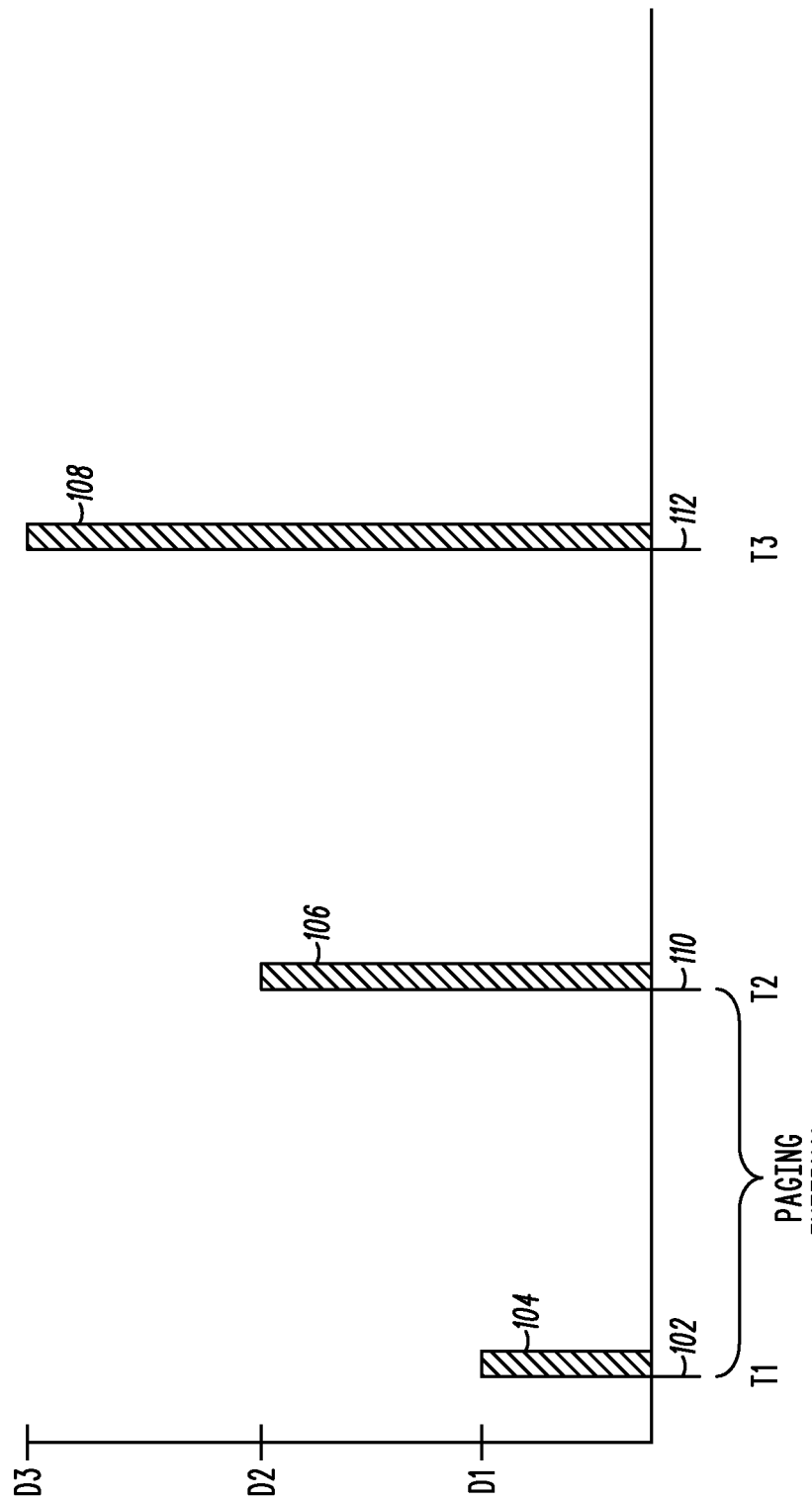
FIG. 1 is an example of a hierarchical paging system used in the prior art.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail any embodiments, it should be observed that the embodiments reside primarily in combinations of method steps and apparatus components related to a method of performing a fast re-page within a paging interval of a wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments described herein may be comprised of one or more conventional processors and unique stored program instructions that control the one or more processors to implement, in conjunction with certain non-processor circuits, some, most, or all of the functions of a method of performing a fast re-page within a paging interval for the wireless communication network described herein. The non-processor circuits may include, but are not limited to, a radio receiver, a radio transmitter, signal drivers, clock circuits, power source circuits, and user input devices. As such, these functions may be interpreted as steps of a method to perform the method of fast re-paging during a paging interval. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In an embodiment, a method for paging a mobile station where the mobile station may be in a dormant state is described. The method begins by sending a first paging message in a first zone of a given area to a selected mobile station wherein the first paging message is sent at the beginning of a paging interval. The first paging message is sent by a base station or other network infrastructure component because the network needs to wake-up the mobile station from the dormant mode to the active mode in order to send messages. The base station then receives a response to the paging message when the mobile station is in the first zone. When the response to the first paging message is not received, a second paging message is sent in a second zone of the given area. The second paging message is sent at a first offset from the sending of the first paging message such that the second paging message is sent within the paging interval. In an embodiment, a third paging message is sent in a third zone when a response to the second message is not received. The third paging message is sent at a second offset from the sending of the first paging message and is also sent within the paging interval. The first zone and the second zone can include a range that overlaps such that the first paging message and the second paging message sent to the range. Likewise the second zone and the third zone can have a range that overlaps so that the second paging message and the third paging message are sent to the range. The amount of overlap between these regions may be set based on the mobile's anticipated level of mobility. An embodiment can also include sending a subsequent paging message during a second paging interval when the response is received to the first paging message and at the first offset from the second paging interval when the response is received to the second paging message. Furthermore, in the preferred embodiment the first and second offsets can be as long as 80 msecs., and the paging interval is between 2 and 5 seconds.

The first zone includes a first group of sectors serviced by a first group of base stations and where the mobile station is most likely to be located, and the second zone includes a second group of sectors serviced by a second group of base stations where the mobile station is most likely to be located when the mobile station is not in the first zone. The sectors can be associated to one of the first zone and the second zone according to one of a distance from the last reported paging zone, time since a last report, presence of an overload condition indicator, signal strength of mobile stations with the first zone and the second zone and the likelihood a mobile station will receive a page. The information as to which sectors or regions are in which zone can be conveyed through broadcast or unicast messaging from the base station, and/or mobile station. This messaging may occur during the mobiles previous routing area update. Additional broadcast messages in each sector may indicate which zone or location the mobile is in at that time.

In another embodiment, the method includes waking up a mobile station from a sleep or dormant mode at the beginning of a paging interval. When the mobile station is in the active mode, the mobile station determines if a first paging message is being received at the beginning of the paging interval, and a response is sent when the first paging message is received at the beginning of the paging interval. When the first paging message is not received at the beginning of the paging interval, the method continues and includes determining if a second paging message is being received at a first offset from the paging interval. As stated, the first offset is within the paging interval. When the second paging message is received at the first offset, a response is sent to the base station. The method continues with receiving a subsequent paging message at a time equal to the paging interval from the beginning of the paging interval when the first paging message is received and from the first offset when the second paging message is received.

In yet another embodiment, a method begins by waking up a mobile station from a sleep mode at the beginning of the first paging interval. The method continues by determining if a first paging message is received at a first offset from the paging interval. The first offset is within the paging interval. When the first paging message is not received, the method determines if a second paging message is received at a second offset from the paging interval. When the second paging is not received, it is determined if a third paging message is received at a second paging interval, which is at a time equal to the paging interval from the first paging interval. The method then sends a response when the third paging message received.

Figure 2:
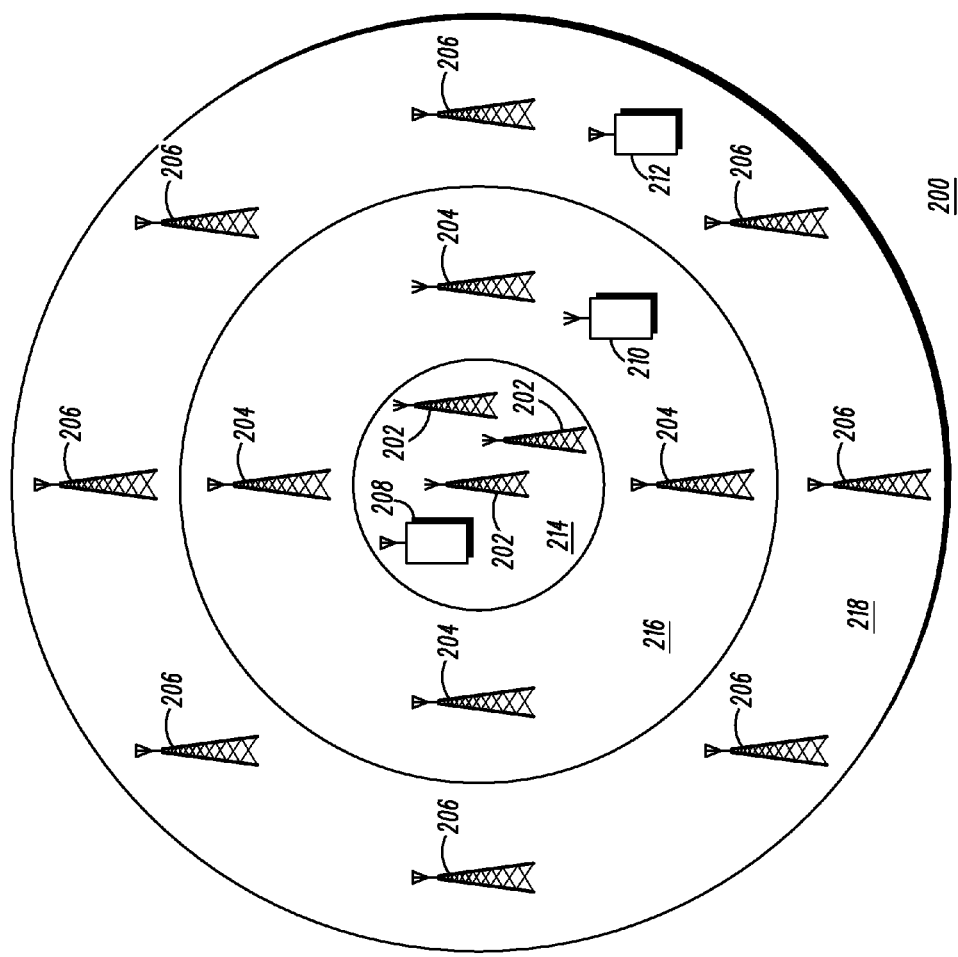
FIG. 2 is an example of paging zones used in accordance with some embodiments of the invention.

Turning to FIG. 2, a wireless communication network 200 is shown. The network includes a plurality of different communication devices including base stations 202-206 and mobile stations 208-212. the base stations 202-206 as well as other infrastructure components (not shown) that provide wireless communication capabilities for mobile stations 208-212 that operate within the network. The mobile stations 208-212 operate in an active mode in which they transmit and receive messages with one of the base stations 202-206. Each base station transmits and receives messages in a given sector, or cell, to and from the mobile stations 208-212 that operate in that cell. Thus, when a call is made or received by a mobile station, the messages that a part of that call are transmitted and received to the base station that services the sector in which the mobile station is operating.

When the mobile station 208-212 is not actively on a call, and therefore not transmitting and receiving messages, it can conserve battery power by being in a sleep or dormant mode. In this mode, the mobile station 208-212 does not perform all operations that are required by the active mode. The mobile station 208-212 will wake-up from the sleep mode to operate in the active mode when it desires to initiate communications. In addition, the mobile station 208-212 will periodically wake-up from the sleep mode to determine if a paging message is being sent from a base station. In this scenario, the mobile station 208-212 wakes-up for a short period of time at a given interval, referred to as the paging interval, to listen for a paging message. The paging interval ranges from around 3 seconds to 5 seconds. A mobile station can wake up with a shorter paging interval. This will result in reduced paging latency but will drain the mobiles battery life faster, In this embodiment, the mobile station can be configured to tolerate one paging interval of paging delay, where that paging interval is between two and five seconds. In view of these needs, paging messages are sent from the base station at a given paging interval of between 3 and 5 seconds.

In an embodiment, the base stations 202-206 are grouped into various zones 214-218 such that each zone includes a number of sectors or cells that are serviced by the base stations within that zone. As seen, the first zone 214 does not overlap with the second zone and the third zone does not overlap with the second zone. As described below, however, an overlap zones can be configured between the first zone and the second zone and between the second zone and the third zone such that in the overlap zones a mobile station is simultaneously in both the first and the second zone or second and third zone. In addition, a base station from the first zone and the second zone provides service to the overlap zone. The zones are grouped according to different criteria including distance from a central location in the network 200. The base stations 202-206 can be grouped according to other criteria including time since a last report that a base station receives a message from a mobile station, presence of an overload condition indicator within the sectors forming the zone, signal strength of mobile stations within each of the sectors of the first zone and the second zone, likelihood a mobile station will receive a page in that sector, the battery life expectancy of the mobile stations in the sector and membership of the zone or sector with a higher priority paging group as understood to be a part of 802.16 standard communication systems.

When a mobile station wakes-up in any sector, it needs to respond if the paging message is being sent, in order to indicate to the base station that the mobile station is prepared to transmit and receive messages. The mobile station desires to wake-up only at the time when the base station or zone it is located under or in, respectively, is sending paging messages to the zone or that sector. As a result, the mobile wakes up at the paging offset after the next paging interval which was the correct paging offset in the base station/zone where the mobile station last observed itself being located. In addition, the mobile stations are configured so that they wake-up from the sleep mode at the paging intervals at the paging offset which is appropriate based on the mobiles last observation of its current zone. Because the mobile stations are not always in the same location within the network 100 or the zones 214-216, the system/group of base stations try to locate the mobile station. Thus, a mobile station may wake-up at a designated paging interval but not receive a paging message because the mobile station has moved from one paging zone to another, and the paging offset appropriate in the previous paging zone is not used in the new/current paging zone.

By limiting the zones in which a paging message is needed to be sent by a base station, paging capacity can be conserved. In addition, battery life is conserved by limiting the number of paging offsets per paging interval which the mobile must monitor. Specifically, the mobile station monitors the earliest or highest priority paging offset being used for its current paging zone, which is based on the mobiles last observation of its current paging zone. The mobile station monitors one paging offset per paging interval. The only exception being one extra wake-up when the mobile wakes up and discovers that the earliest paging offset for the paging zone it was previously in, is not used in its new current location. In this case, the mobile monitors the earliest offset which is used in its new location.

Figure 3:
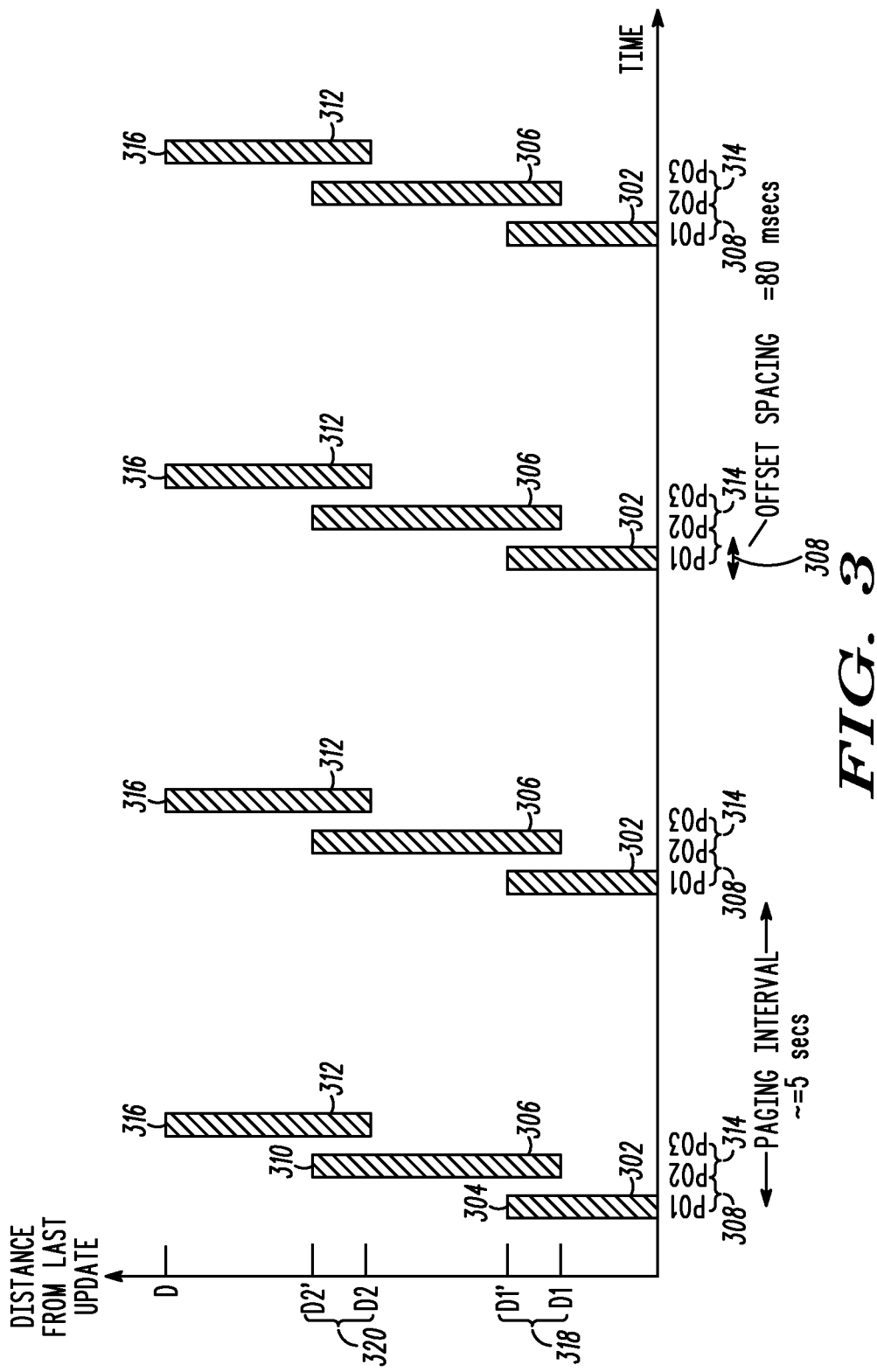
FIG. 3 is an example of the cascading paging system used in accordance with some embodiments.

For the mobile station to quickly receive the paging message without having to always wait for the next paging interval, an embodiment includes a fast re-paging method, or cascading hierarchical paging method, as is shown in FIG. 3. FIG. 3 is a graph that demonstrates the timing and the distance that a particular base station sends a paging message to a particular mobile station. For example, a base station 202 can be sending a paging message to any of the mobile stations 208-212. Time is shown on the x-axis, and distance is shown on the y-axis. When a base station needs to send a paging message to a mobile station, a first paging message 302 is sent at the beginning of paging interval, where the paging interval can be between 3 and 5 seconds. In general, the first paging message is always sent at the beginning of the paging interval and not at other times during the paging interval. The beginning of the paging interval is timed such that the paging message is sent when the mobile station wakes-up to receive the paging message. The paging message is sent a given distance 304. The distance 304 corresponds to the area of the first zone 214. Thus, a first paging message is shown to be sent at the beginning of the paging interval where the paging message is sent in the first zone.

A second paging message 306 can be sent from the base station 202 to one of the mobile stations 208-212. This message is sent at a first paging offset 308 from the beginning of the paging interval. The first paging offset is a time that is less than the time of the paging interval such that the first paging offset is within the paging interval. In an embodiment, the first paging offset is approximately 80 msecs. The second paging message 306 is sent over a given second distance 310 that is generally farther than the first distance 304. The second distance 310 can correspond to the second zone 216 such that the second paging message is not sent to the complete first zone. Thus, a paging message is sent to cover both the first zone and the second zone as between the first paging message and the second paging message.

A third paging message 312 can also be sent from the base station 202 to one of the mobile stations 208-212. This message is sent a second paging offset 314 from the first paging offset. The duration of the second paging offset 314 can be equivalent to the duration of the first paging offset or a different duration. Nonetheless, the second paging offset 314 is also a time that is less than the time of the paging interval such that the second paging offset 314 is within the paging interval. The third paging message 312 is sent over a third distance 316 that is generally farther than the first and second distances 304, 310. The third distance 316 can correspond to the third zone 218 such that the third paging message is not sent to the first zone 214 or the complete second zone 216. Thus, a paging message sent to cover the first, second and third zones as between the first, second and third paging messages, respectively.

As seen in FIG. 3, there is a first overlap zone 318 of the second zone 216 that covers an area of the first zone 214. The first overlap zone 318 is arranged such that the first paging message and the second paging message are sent to this area. Thus, mobile stations that operate in the first overlap zone can respond to the first paging message or the second paging message depending on various criteria including which signal is stronger. For example, the mobile station may respond to the second paging signal if the mobile station is moving from the first zone to the second zone. In this case, the mobile station may wake-up for paging message 302, and discover that it is no longer within the first paging zone. At this point, therefore, the mobile station begins monitoring for paging message 306. In addition, there is a second overlap zone 320 for the third zone 218 that covers an area of the second zone 216. Like the first overlap zone 318, the second overlap zone 320 is arranged such that the second paging message and the third paging message are sent to this area. Thus, mobile stations that operate in the second overlap zone can respond to either of the second or third paging message depending on network configurations and network factors such as the direction in which the mobile station is moving.

If the mobile station is moving from the second zone into the first zone, it may wake-up for paging message 306 to discover that it is in the area of overlap between the second zone and the first zone. In this case, the mobile station will subsequently wake-up for paging message 302, which is earlier and a preferred offset for mobile stations when they are in the area of overlap between the first and second zones. In this case, the mobile station will still be able to check for paging message 306 as in this overlap area the page will be transmitted by the base station at the paging interval and the first offset.

Figure 4:
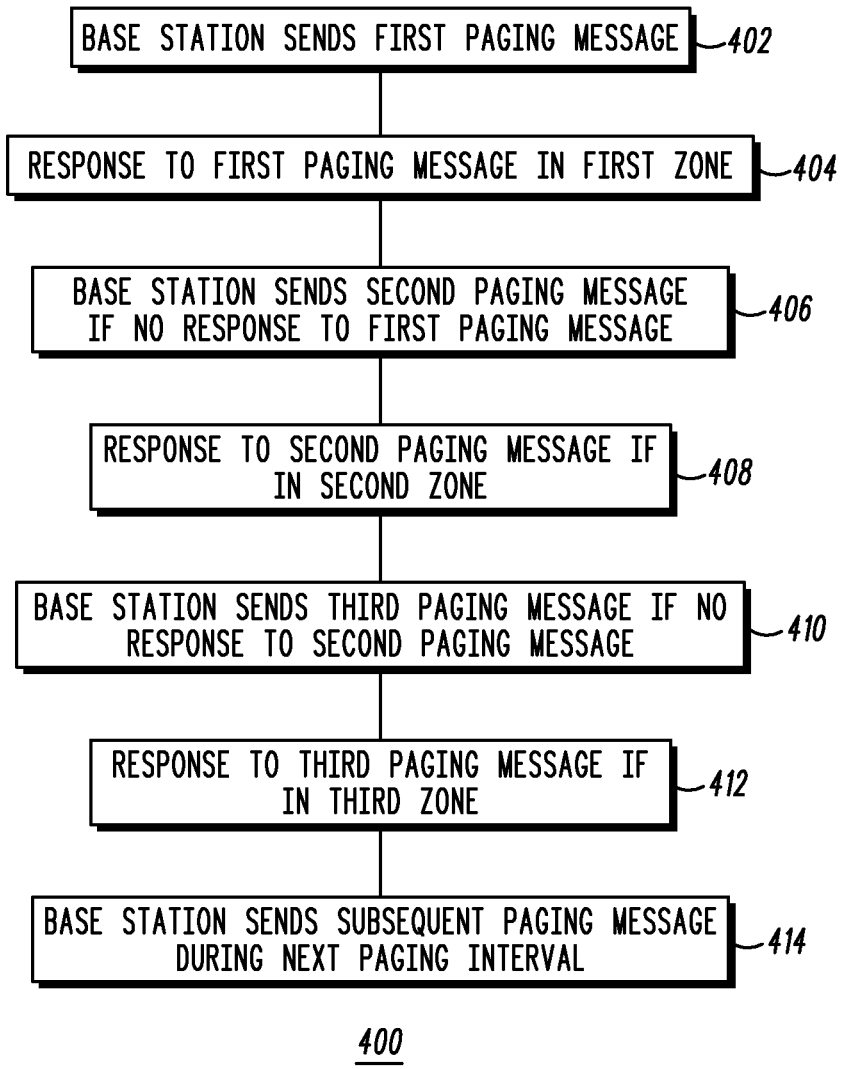
FIG. 4 is a flow diagram using the cascading paging system used in accordance with some embodiments.

FIG. 4 illustrates a flow diagram 400 of an embodiment of a fast re-page when a base station 202 is attempting to locate a mobile station 208-212 within the wireless communication network 100. The base station determines that it needs to establish a communication session with the mobile station because a call is intended for that mobile station or for some other reason required by the network. To begin, the base station 202 sends 402 a first paging message 302 a first distance 304, which corresponds to the first zone 214. If the first paging message is intended for mobile station 208, that mobile station 208 will respond 404 with a response such that the base station 202 and the mobile station 208 will begin the desired communication session.

If the paging message is intended for another mobile station that is not within the first zone, the base station will not receive the expected response as the intended mobile station is not within the first zone. Thus, the base station 202 sends 406 a second paging message 306 a second distance 310, which corresponds to the second zone 216. The second paging message 306 is sent 406 at the first offset from the paging interval. If the first offset is 80 msecs. the second paging message is sent 80 msecs. after the first paging message is sent 402. If the second paging message is intended for the mobile station 210, which is in the second zone 216, mobile station 210 will respond 408 with a response such that the base station 202 and the mobile station 210 will begin the communication session.

If the paging message is intended for another mobile station that is not within the first zone or the second zone, the base station will not receive the expected responses as the intended mobile station is not within either of those zones. Thus, the base station 202 sends 410 a third paging message 312 a third distance 314, which corresponds to the third zone 218. The third paging message 312 is sent 410 at a second offset from the first offset. If the second offset is also 80 msecs. the third paging message is sent 160 msecs. after the first paging message is sent. If the third paging message is intended for mobile station 212, which is in the third zone, mobile station 212 will respond 412 with a response such that the base station and the mobile station 12 will being the communication session. The method can continue for as many zones that are created within the network 100.

Once the base station 202 receives a response to the first, second or third paging message, the base station 202 sends 414 a subsequent paging message at a time equal to the paging interval from the paging message that was responded to. In other words, the subsequent paging message is sent at the beginning of the second paging interval if the mobile station is in the first zone, sent at the first offset from the second paging interval if the mobile station is in the second zone and sent at the second offset from the second paging interval if the mobile station is in the third zone.

Figure 5:
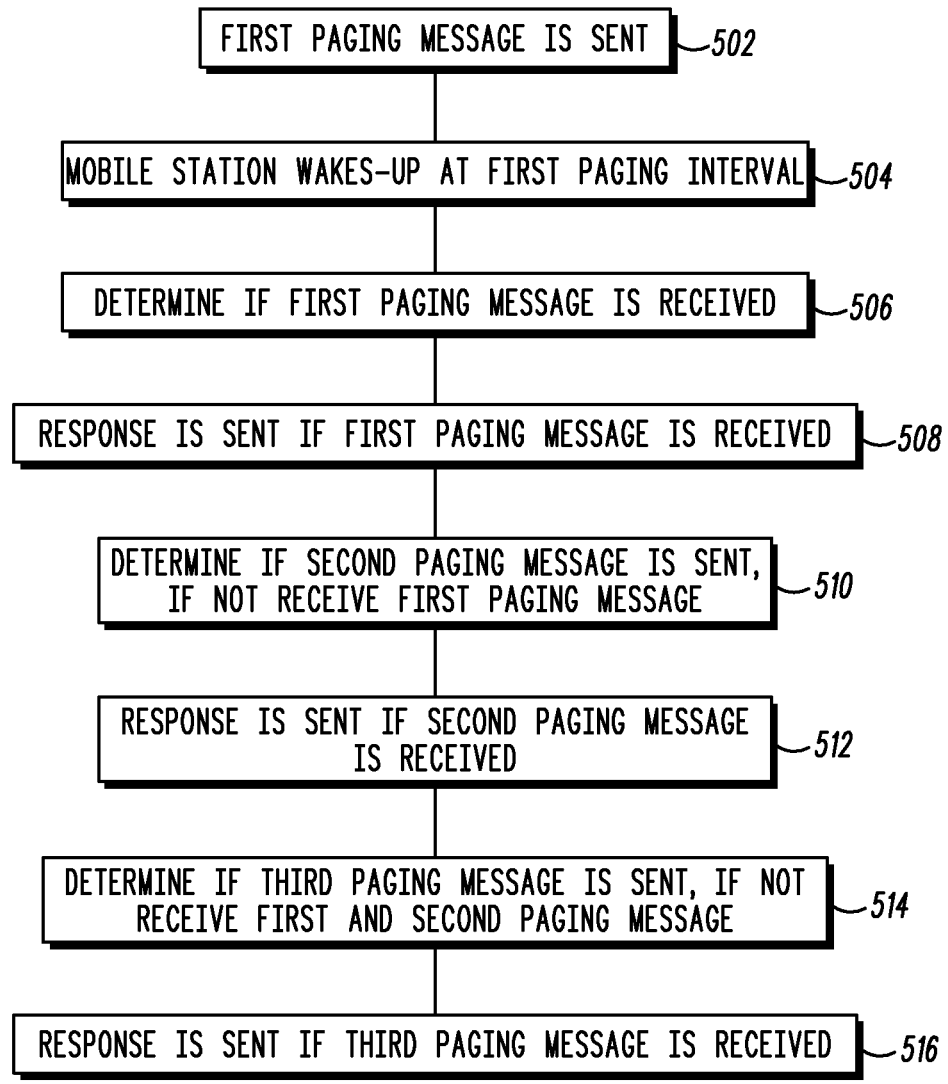
FIG. 5 is a flow diagram using the cascading paging system when a mobile device is moving away from the last known paging zone.

FIG. 5 illustrates a flow chart 500 of a mobile station responding to a paging message when it is moving away from the location within the network that was last known by the base station. In this embodiment, the base station 202 knows that the mobile station was in the first zone during the most recent communication session when the base station and the mobile station were transmitting and receiving messages with one another. Thus, in the next instance where the base station 202 intends to send a paging message to the mobile station, the first paging message is sent 502 to the mobile station at the beginning of the first paging interval. The first paging message is sent in the first zone because this is where the base station expects to find the mobile station. It is understood, however, that the mobile station may not be in the first zone 214 and thus may be in the second or third zones 216, 218. Similar to the base station expecting to find the mobile station in the first zone, the mobile station wakes-up 504 at the first paging interval and expects to receive the first paging message. The mobile station then determines 506 if the first paging message has been received. If the first paging message is received, then a response 508 is sent back to the base station such that the base station and mobile station transmit and receive messages. The base station understands that by responding to the first paging message that the mobile station is in the first zone.

On the other hand, when the first paging message is not received by the mobile station, the mobile station determines 510 if the second paging message has been received a time equivalent to the first offset from determining if the first paging message has been received. The first offset is within the paging interval. If the second paging message is receive, a response 512 is sent back from the mobile station to the base station such that the base station and the mobile station begin to transmit and receive messages. The base station understands that by responding to the second paging message that the mobile station is in the second zone.

If the mobile station does not receive either the first or the second paging message, it determines 514 if the third paging message is received. The third paging message is sent a second offset from the first offset such that the third paging message is received within the paging interval. If the third paging message is received, a response 516 is sent back to the base station such that the base station and the mobile station begin to transmit and receive messages from one another. The base station understands that by responding to the third paging message that the mobile station is in the third zone.

Figure 6:
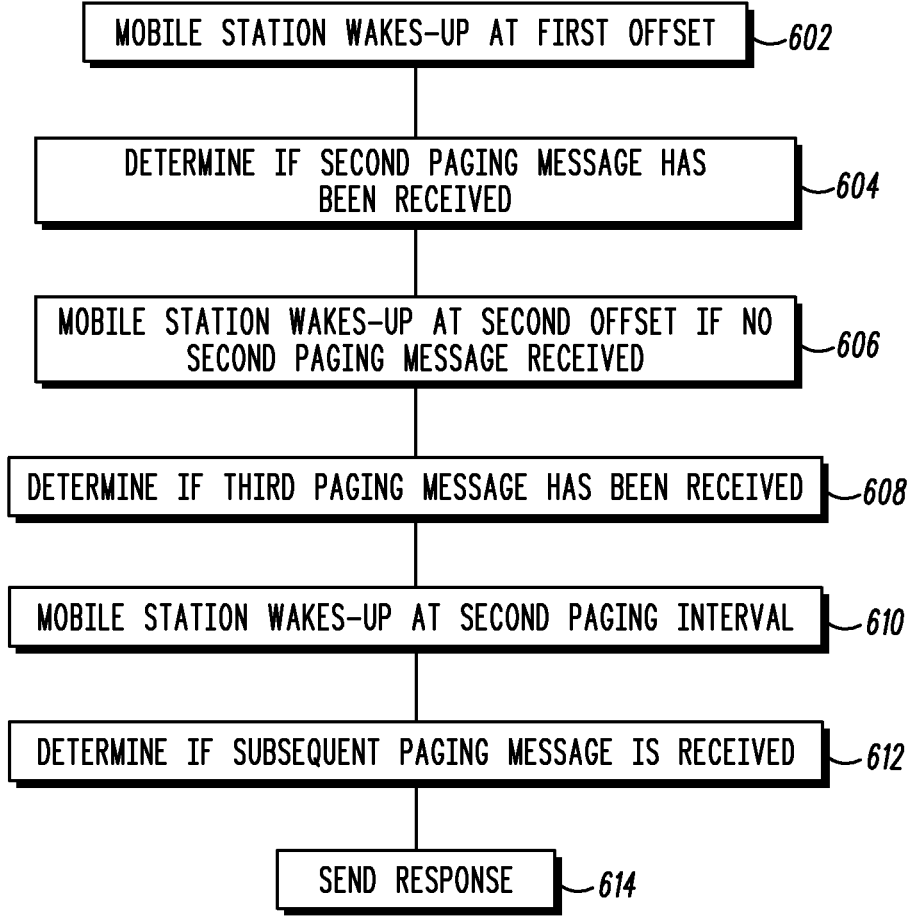
FIG. 6 is a flow diagram using the cascading paging system when a mobile device is moving towards the last known paging zone.

Turning to FIG. 6, a flow chart 600 is shown that illustrates an embodiment as mobile station is moving towards a zone in which it was last located. In other words, the mobile station has missed receiving any of the paging messages during a given paging interval. In this embodiment, the first zone is the zone in which the base station most likely expects to locate the mobile station. Nonetheless, the mobile station is not in the first zone, but is moving from a second or third zone in the direction of the first zone. In this embodiment, a mobile station wakes-up 602 from a dormant or sleep mode at a first offset from the paging interval. It initially wakes-up at this time because it expects to be in the second zone and to receive the second paging message. The mobile station determines 604 if the second paging message has been received. If the mobile station does not receive the second paging message, it wakes-up 606 again at the second offset from the paging interval. The mobile station determines 608 if the third paging message has been received. If the mobile station does not receive the third paging message, it wakes-up 610 at the second paging interval and determines 612 if the subsequent paging message has been received. The mobile station thus responds to a paging message in less time than having to wait a complete paging interval between searching for paging messages. The mobile station then sends 614 a response when the subsequent paging message is received. In an embodiment, the mobile station can continue to sequence through the process of waking up at the paging intervals and offsets to determine if a paging message has been sent.

In another embodiment, the first, second and third zones 214-218 are configured so that there are the overlap zones 318 and 320. In these areas, more than one paging message is being received, as described. A mobile station that is in an overlap zone will receive at least one of the paging messages. For example, the mobile station that is moving from the first zone to the second zone may be in first overlap zone 318. The strengths of the first paging message and the second paging message will vary depending on where within the portion the mobile station is located and the direction in which it is moving. Thus, the mobile station will respond to the first paging message if it is further from the edge of the first zone or it is moving in the direction of the first zone. The mobile station will likewise respond to the second paging message if it is further from the edge of the second zone or it is moving in the direction of the second zone.

Based on the foregoing, the mobile station first wakes-up from a stand-by, sleep or dormant mode based on its understanding of the last zone in which it was located. Thus, if a mobile station was last in the first zone, it will wake up to determine if a paging message is being sent at the beginning of the first interval. If the mobile station was last in the second zone, it will wake-up at the first offset, and it will wake up at the second offset if it was last in the third zone. If the mobile station was last in one of the overlap zones, it will wake-up next in one of the two zones that create the overlap. The choice of which zone can be based on a number of criteria including which zone has an earlier wake up time, e.g. the beginning of the paging interval over the first paging offset, the zone that has the strongest paging message, the zone into which the mobile station was moving when it last woke up.

In view of the foregoing, the cascading paging that occurs in the paging interval provides numerous benefits over hierarchical paging. In hierarchical paging, a mobile station must wait until the next paging interval to receive a paging message if the first paging message is sent in an area that the mobile station is not located. According to an embodiment, the mobile station generally will receive a paging message in a time equivalent to a paging offset, which is significantly less time than a paging interval. Accordingly, if the current sector's distance from the mobile station's last area, e.g. zone, the mobile station and the base station monitor the page offset for that sector. If the distance, however, is greater than the zone, the mobile station and base station monitor the paging offset for zone in which the mobile station is located. If the mobile station wakes-up in another sector or zone which is too late for the preferred paging interval or offset for that sector or zone, the mobile station subsequently wakes-up at the later offset that is within the same paging interval. Moreover, the fast re-paging or cascading paging minimizes the paging delay when the mobile station is not in its last known zone and avoids a base station suffering an entire paging interval delay after failing to find the mobile station in the last known zone before paging the mobile again in a neighboring zone. In addition, paging cascaded avoids the need to pre-emptively page outside of a mobile station's last known zone in order to avoid additional paging interval delays.

For fast re-paging or cascading paging, the base station and the mobile station can agree upon a wake-up time offset in which the paging message will be sent and responded to. The paging offset can depend upon the distance from the last routing area update of the mobile station such that the zone will be the same as the distance between the mobile station's current sector location and its last update location. If the mobile station is in the first zone, the mobile station will monitor the paging interval. If the mobile station was in the second zone when at last checked its location, the mobile station will monitor the first offset. And the mobile station will monitor the second offset if it is in the third zone. The mobile station wakes-up for the preferred wake-up time/ offset for the sector in which the mobile was located in at the time of the last wake-up. If the mobile station detects asynchronous idle handoff like situation and it wakes-up in a new sector that is too late for receiving the paging message for that sector, the mobile station monitors the next paging offset, i.e. a fast re-page, that occurs within the same paging interval. If mobile station is closer to the base station than expected, it monitors an earlier offset in the subsequent paging interval. In other words, the cascaded page method described provides for a method that permits a mobile station to receive a paging message from a base station without having to register with the base stations due to the mobile station's movements within the network.

In an alternative embodiment, the mobile may perform a registration or a routing area update at the time of it moving between paging zones, e.g. at the time it moves from the first paging zone 214 to the second paging zone 216. Of course, in other embodiments, the routing area update does not need to be performed. This registration could be a routing area update, or a presence registration, or any other type of call which will achieve an implicit or explicit location updates registration. In an embodiment, the mobile station can perform a registration at the time it discovers that it has moved from one zone to another zone. In this embodiment, cascading paging can be provided because the paging delay will be reduced as described above. In this embodiment, if the first zone covers the entire registration zone/distance, then immediately after or while performing a registration/ routing area update, the mobile will monitor for the second page at the first offset from the start of the paging interval.

The mobile may also use its anticipated mobility/direction to anticipate which paging offset it should wake-up for, e.g. anticipating that it is departing the second paging zone in the direction of the first paging zone. In this case, it may wake up at 302 even though its last location was observed in the second paging zone.

In an embodiment, the configuration of the first, second and third zones is dynamic. The zones are configured such that first zone is the zone in which a base station is most likely to find a desired mobile station. This first zone may be the sector in which the base station last communicated with the mobile station. The second zone is the zone in which the base station expects to fine the mobile station if it cannot find that mobile station in the first zone. If the zones are configured in this way, the sector in which the base station finds the mobile station in one communication session becomes a part of the first zone for the next communication session between the devices. Thus, the sectors that are a part of any zone can change from time to time.

In yet another embodiment, the cascading paging operates within a wireless communication network operating according to 802.16. In this embodiment, a mobile station can be provisioned into multiple paging groups. Thus, the first paging group corresponds to first paging zone 214, the second paging group corresponds to the second paging zone 216 and the third paging group corresponds to the third paging zone 218. In addition, the first paging group utilizes the paging interval, the second paging group utilizes the first offset and the third paging group utilizes the second paging offset. For 802.16, the priorities of the paging groups can be specified and set by the network. In this way, the network would specify which paging group has higher priority or is the first paging zone. The mobile station will therefore wake up at the time associated with the highest priority paging group, which can be provisioned in the sector that the mobile station was located in the previous time that it was active. The paging group associated with the first zone has highest priority, and the paging group associated with the second zone as the next highest priority, and the paging group associated with a third zone has the lowest priority.

Moreover, a mobile station, or access terminal, and a base station, or access node can operate using assisted paging. In assisted paging, the access node knows that the access terminal may use one of two routes as it moves along a path. The first route may correspond to a first paging zone using the paging interval and the alternative route corresponds to the second paging zone using the first offset. The access node therefore attempts to contact the access terminal in the first paging zone during the paging interval. If unsuccessful, the access node attempts to reach the access terminal in the second paging zone at the first offset. For example, a user may have two routes to reach a desired destination. The access node attempts to contact the access terminal on the primary route at the paging interval and then attempts to contact the access terminal on the secondary route at the first offset. Thus, the first paging zone and the second paging zone are associated using other criteria, e.g. routes taken, time of day, network conditions, that are different from the distance.

In yet another embodiment, within the 3GPP2 Rel. C specification, the first page offset from the beginning of the paging interval may be referred to as the fast re-page. Thus, when the mobile determines it is in the second paging zone and not the first, the mobile will not wake up at the beginning of the next paging interval, but instead will wake up at the fast re-page time, otherwise known as the first offset from the beginning of the paging interval.

It is noted that communication networks and systems can be configured such that after a given amount of time, i.e. after a threshold time, the mobile station will revert to a mode where only one paging offset regardless of the mobile station's location. If it has been a significantly long time since the last routing area update, the likelihood that a mobile station will be reached in the first paging zone is increased. Therefore, the likelihood of reaching the mobile station is increased if the number of paging offsets is reduced.

In addition, a request initiated page can arrive after the start of the paging interval and before the first paging offset, e.g. between paging interval and first offset. In this situation, the base station can wait until the next paging interval before transmitting the page. Alternatively, the network can proceed to transmit the page at the second paging offset if the system is underloaded or that the service is particularly delay sensitive. This configuration can also be used if it has been a particularly long period of time since the mobile station has been observed.

In the foregoing specification, specific embodiments have been described. However, one of ordinary skill in the art appreciates that various modifications and changes can be made without departing from the scope as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method comprising:
determining, by a base station, a first group of sectors where a communication device is most likely to be located according to one of a presence of an overload condition indicator and membership of a cell within a higher priority paging group;
determining, by the base station, a second group of sectors where the communication device is most likely to be located when the communication device is not in the first group of sectors according to one of a presence of an overload condition indicator and membership of a cell within a higher priority paging group;
sending, by the base station, a first paging message in a first zone to the communication device wherein the first paging message is sent at the beginning of a paging interval, wherein the first zone comprises the first group of sectors;
receiving a response to the first paging message when the communication device is in the first zone; and
sending, by the base station, a second paging message in a second zone when the response to the first paging message is not received, wherein the second zone comprises the second group of sectors, wherein the second paging message is sent at a first offset from the sending of the first paging message, and wherein the first offset occurs less than one paging interval after the sending of the first paging message,
wherein the first paging message is sent over a first distance, wherein the second paging message is sent over a second distance, and wherein the first distance is different from the second distance.

2. The method according to claim 1 wherein the second zone includes a range that does not overlap with the first zone such that the first paging message is not sent to the range, and the second paging message is sent to the range, when no page response is received after the first paging message.

3. The method of claim 1 wherein the first paging message is always sent at the start of the paging interval.

4. The method according to claim 1 further comprising sending, by the base station, a third paging message in a third zone when a response to the second paging message is not received wherein the third paging message is sent at a second offset from the sending of the first paging message within the paging interval.

5. The method according to claim 1 wherein the communication device does not perform a routing area update when moving from the first zone to the second zone.

6. The method according to claim 1 wherein the communication device performs a routing area update when moving from the first zone to the second zone.

* * * * *